(12) United States Patent
Lee et al.

(10) Patent No.: US 11,069,269 B2
(45) Date of Patent: Jul. 20, 2021

(54) DISPLAY DEVICE INCLUDING CRACK SENSING LINE

(71) Applicant: Samsung Display Co., Ltd., Yongin-Si (KR)

(72) Inventors: Kwang Sae Lee, Asan-si (KR); Won Kyu Kwak, Seongnam-si (KR); Ki Myeong Eom, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/751,101

(22) Filed: Jan. 23, 2020

(65) Prior Publication Data

US 2020/0242986 A1 Jul. 30, 2020

(30) Foreign Application Priority Data

Jan. 30, 2019 (KR) ........................ 10-2019-0011859

(51) Int. Cl.
*G09G 3/00* (2006.01)
*G06F 1/16* (2006.01)
*G06F 3/041* (2006.01)

(52) U.S. Cl.
CPC .......... *G09G 3/006* (2013.01); *G06F 1/1652* (2013.01); *G06F 3/0412* (2013.01); *G09G 2330/12* (2013.01)

(58) Field of Classification Search
CPC .... G09G 3/006; G09G 2330/12; H01L 22/34; G06F 1/1637; G06F 1/1652; G06F 3/0412
See application file for complete search history.

(56) References Cited

U.S. PATENT DOCUMENTS

| | | | |
|---|---|---|---|
| 2011/0141042 A1* | 6/2011 | Kim | G06F 3/0412 345/173 |
| 2014/0319523 A1* | 10/2014 | Lee | H01L 22/34 257/48 |
| 2016/0043010 A1* | 2/2016 | Kwak | H01L 27/3276 257/48 |
| 2016/0232826 A1* | 8/2016 | Cho | H01L 27/3276 |

FOREIGN PATENT DOCUMENTS

| | | |
|---|---|---|
| KR | 10-2018-0014906 A | 2/2018 |
| KR | 10-2018-0064596 A | 6/2018 |
| KR | 10-2018-0109390 A | 10/2018 |

* cited by examiner

*Primary Examiner* — Xuemei Zheng
(74) *Attorney, Agent, or Firm* — Innovation Counsel LLP

(57) ABSTRACT

A display device according to exemplary embodiments includes: a display panel including: a first opening and a second opening and displaying an image; a first crack sensing line disposed around the first opening; and a second crack sensing line disposed around the second opening, wherein a crack around the first opening is sensed by disconnection of the first crack sensing line, and a crack around the second opening is sensed by disconnection of the second crack sensing line.

19 Claims, 7 Drawing Sheets

DISPLAY DEVICE INCLUDING CRACK SENSING LINE

CROSS-REFERENCE TO RELATED APPLICATION

This application claims priority to and the benefit of Korean Patent Application No. 10-2019-0011859 filed in the Korean Intellectual Property Office on Jan. 30, 2019, the entire contents of which are incorporated herein by reference.

BACKGROUND

(a) Field

The present disclosure relates to a display device, and in particular, relates to a display device having a crack sensing line disposed around an opening.

(b) Description of the Related Art

Recently, various types of portable electronic devices integrate a camera such as a smart phone to allow a user to carry only one electronic device integrated with a camera instead of separately carrying a camera in addition to a portable electronic device.

In such an electronic device with an integrated camera, the integrated camera is generally provided outside of an image display area of the electronic device, and as a result, a space where the electronic device may display an image may be decreased. Various techniques for eliminating these problems have been developed.

The above information disclosed in this Background section is only for enhancement of understanding of the background of the present disclosure, and therefore it may contain information that does not form a prior art that is already known to a person of ordinary skill in the art.

SUMMARY

Exemplary embodiments of the present disclosure provide a display device that is capable of sensing a crack formed around openings in a display device having two or more openings. The display device may sense whether the crack is formed around an opening. In addition, the display device may easily confirm where cracks occur by distinguishing the cracks from other cracks when the cracks are detected at a position other than a vicinity of the openings.

A display device according to exemplary embodiments includes: a display panel including a first opening and a second opening and displaying an image; a first crack sensing line disposed around the first opening; and a second crack sensing line disposed around the second opening, wherein a crack around the first opening is sensed by disconnection of the first crack sensing line, and a crack around the second opening is sensed by disconnection of the second crack sensing line.

A first end of each of the first crack sensing line and the second crack sensing line may receive a sensing voltage through a voltage applying signal line.

A second end of the first crack sensing line may be connected to a first detection signal line, and the first detection signal line may be connected to a first data line.

A second end of the second crack sensing line may be connected to a second detection signal line, and the second detection signal line may be connected to a second data line.

The display panel may include: a lower display unit including a bending portion and a driver; and an upper display unit disposed on the lower display unit.

The lower display unit may include a display area including a pixel and a peripheral area disposed around the display area, the bending portion and the driver may be disposed in the peripheral area, and the bending portion and the driver may be protruded from a side of the display area.

The first opening and the second opening may be disposed in the display area.

The pixel may include an organic light emitting diode and a diode driving circuit supplying a current to the organic light emitting diode.

The voltage applying signal line may include a voltage applying line disposed in the upper display unit, and a peripheral voltage applying line disposed in the lower display unit.

The peripheral voltage applying line may be formed across the bending portion of the lower display unit and the driver.

The voltage applying line and the peripheral voltage applying line may be electrically connected through a voltage applying line pad.

The first detection signal line may include a first sensing line disposed in the upper display unit and a first peripheral sensing line disposed in the lower display unit.

The first peripheral sensing line may be formed across the bending portion of the lower display unit and the driver.

The first sensing line and the first peripheral sensing line may be electrically connected through a first sensing line pad.

The second detection signal line may include a second sensing line disposed in the upper display unit and a second peripheral sensing line disposed in the lower display unit.

The second peripheral sensing line may be formed across the bending portion of the lower display unit and the driver.

The second sensing line and the second peripheral sensing line may be electrically connected through a second sensing line pad.

The upper display unit may include a touch sensor for sensing a touch input.

A display panel crack sensing wire for sensing a crack formed in the display panel may be further included.

A bending portion crack sensing wire for sensing a crack formed in the bending portion may be further included.

At least one of the voltage applying signal line, the first detection signal line, and the second detection signal line may have a symmetrical structure extending along opposite sides of the peripheral area.

According to the exemplary embodiments, it may be determined whether a crack is formed around the opening of the display device through the sensing line disposed around the opening. In addition, when the display device includes two or more openings, it may be determined whether the crack is formed around any opening. Further, the display device can distinguish cracks formed in other parts from the cracks that are formed in the periphery of the opening.

DETAILED DESCRIPTION OF THE EMBODIMENTS

Figure 1:
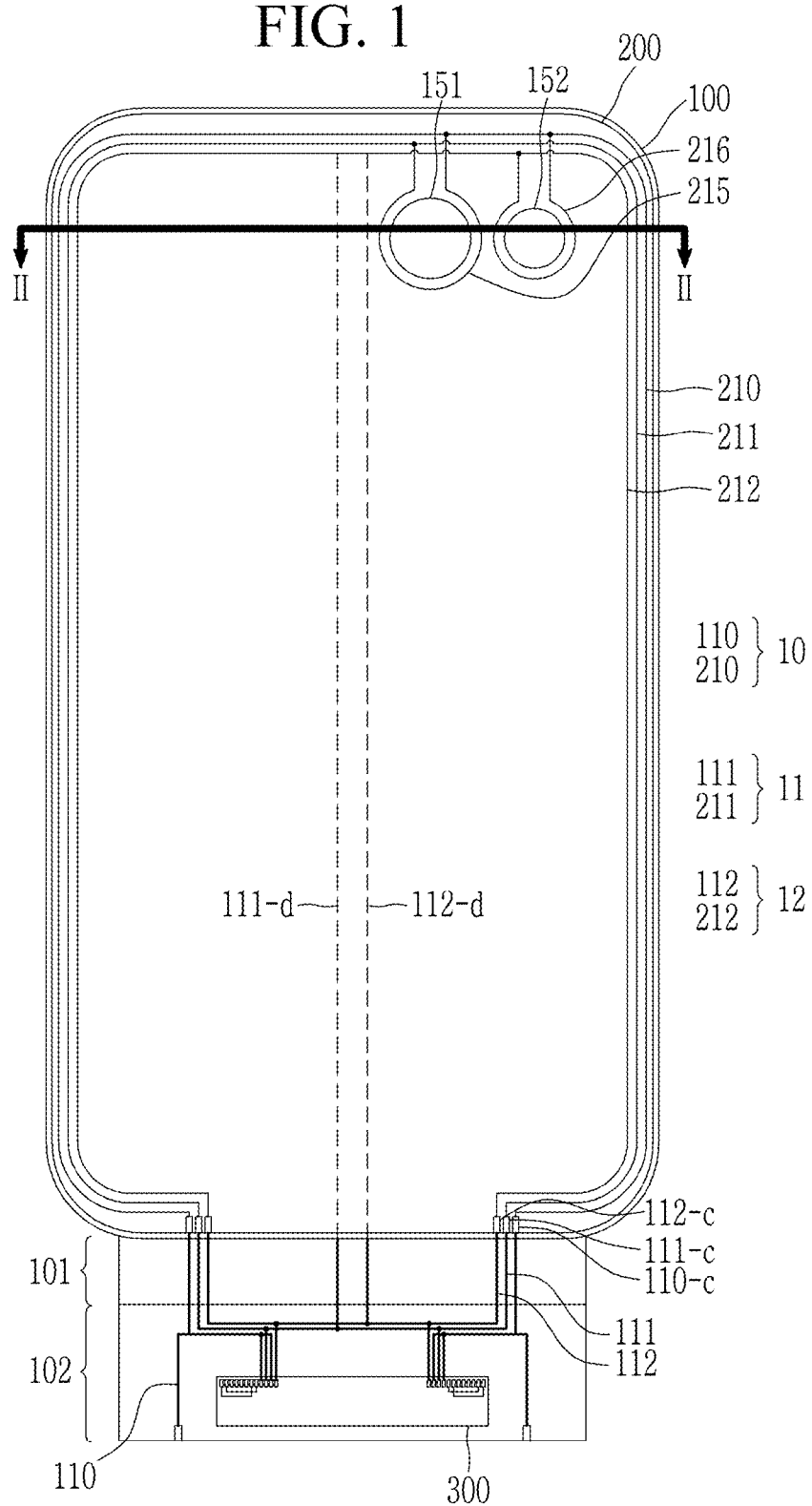
FIG. 1 is a top plan view of a display device according to an exemplary embodiment.

The present disclosure will be described more fully hereinafter with reference to the accompanying drawings, in which exemplary embodiments of the present disclosure are shown. As those skilled in the art would realize, the described exemplary embodiments may be modified in variously different ways, without departing from the spirit or scope of the present disclosure.

The drawings and description are to be regarded as illustrative in nature and not restrictive. Like reference numerals designate like elements throughout the specification.

Further, in the drawings, a size and thickness of each element are arbitrarily represented for better understanding and ease of description, and the present disclosure is not limited thereto. In the drawings, the thickness of layers, films, panels, regions, etc., may be exaggerated for clarity. In the drawings, for better understanding and ease of description, the thicknesses of some layers and areas may be exaggerated.

It will be understood that when an element such as a layer, film, region, or substrate is referred to as being "on" another element, it can be directly on the other element or one or more intervening elements may also be present. In contrast, when an element is referred to as being "directly on" another element, there are no intervening elements present. Further, in the specification, the word "on" or "above" means positioned on or below an object portion, and does not necessarily mean positioned on the upper side of the object portion based on a gravitational direction.

In addition, unless explicitly described to the contrary, the word "comprise" and its variations such as "comprises" or "comprising" will be understood to imply n inclusion of stated elements but not an exclusion of any other elements.

Further, throughout the specification, the phrase "on a plane" means viewing a target portion from the top, and the phrase "on a cross-section" means viewing a cross-section formed by vertically cutting a target portion from the side.

Hereinafter, a display device according to an exemplary embodiment is described with reference to FIG. 1 and FIG. 2.

Figure 2:
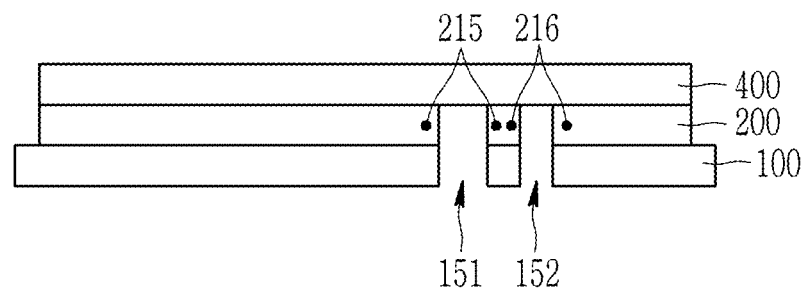
FIG. 2 is a cross-sectional view of the display device of FIG. 1 taken along a line II-II.

FIG. 1 is a top plan view of a display device according to an exemplary embodiment, and FIG. 2 is a cross-sectional view of the display device of FIG. 1 taken along a line II-II.

Referring to FIG. 1 and FIG. 2, the display device includes a lower display unit 100 and an upper display unit 200 having a first opening 151 and a second opening 152, and a first crack sensing line 215 and a second crack sensing line 216 are formed in the lower display unit 100 and the upper display unit 200.

In the exemplary embodiment of FIG. 1 and FIG. 2, the first crack sensing line 215 and the second crack sensing line 216 are disposed in the upper display unit 200. However, it is understood that more than two opening and crack sensing lines may be included in the display device, and the first crack sensing line 215 and the second crack sensing line 216 may be disposed in the lower display unit 100 without deviating from the scope of the present disclosure.

Here, the first crack sensing line 215 may be disconnected when a crack occurs in the vicinity of the first opening 151, thereby allowing detection of a crack occurrence through the first crack sensing line 215.

In addition, the second crack sensing line 216 may be disconnected when the crack occurs in the vicinity of the second opening 152, thereby allowing detection of the crack occurrence through the second crack sensing line 216.

The first crack sensing line 215 and the second crack sensing line 216 may allow detection of a crack occurrence in various ways. According to the exemplary embodiment of FIG. 1 and FIG. 2, a sensing voltage may not be applied due to the disconnection caused by the crack occurrence, and thereby a pixel column may indicate the crack occurrence by displaying a luminance (referring to FIG. 8).

More specifically, the structure of FIG. 1 and FIG. 2 is described as follows.

As shown in FIG. 1 and FIG. 2, the display device includes the lower display unit 100, the upper display unit 200, and a window 400 covering the lower display unit 100 and the upper display unit 200, and the two openings 151 and 152 are formed in the lower display unit 100 and/or the upper display unit 200. The lower display unit 100, the upper display unit 200, and layers interposed therebetween are collectively referred to as a display panel.

The lower display unit 100 includes a display area for displaying an image and a peripheral area surrounding the display area, and the peripheral area according to the present exemplary embodiment includes a bending portion 101 that protrudes in one direction from the display area and a driver 102.

The display area includes a plurality of pixels, and one pixel includes an organic light emitting diode and a diode driving circuit for providing current to the organic light emitting diode. The plurality of pixels disposed in the display area of the lower display unit 100 may be covered by an encapsulation layer, and the encapsulation layer may prevent moisture or air from permeating into an emission layer of the organic light emitting diode. The boundary between the display area and the peripheral area is shown in FIG. 1. In one embodiment, the display area may have a size corresponding to the size of the upper display unit 200. The two openings 151 and 152 are disposed inside the display area, but the region where the openings 151 and 152 are disposed and the periphery thereof do not display the image because there are no pixels formed therein.

The peripheral area of the lower display unit 100 may be formed in upper, lower, leftward, and rightward regions of the display area in addition to the bending portion 101 and the driver 102 in FIG. 1. Alternatively, the peripheral area of the lower display unit 100 may be disposed between the bending portion 101 and the display area. The peripheral areas disposed around the display area may have a narrow width according to the example, and the width of the peripheral area may be reduced or eliminated.

The lower display unit 100 include a flexible substrate formed of a plastic or an organic polymer material that has a flexible characteristic, and the pixel (the diode driving circuit and the organic light emitting diode) is formed in the flexible substrate.

In the peripheral area of the lower display unit 100, the bending portion 101 is bent by using the characteristic of the flexible substrate and is curved toward a rear surface of the lower display unit 100, and signal wires connecting the display area and the driver 102 are formed. In FIG. 1, a portion of the signal wires are shown to illustrate the characteristics of the present disclosure. Particularly, in FIG. 1, only a first data line 111-*d* and a second data line 112-*d* among a plurality of data lines are shown. Since a plurality of pixel columns are connected along one data line, a voltage applied to one data line may affects the pixels included in one entire pixel column.

On the other hand, the upper display unit 200 may include a touch sensor capable of sensing a touch input, a voltage applying line 210, a pair of sensing lines 211 and 212, and the pair of crack sensing lines 215 and 216 that are formed around the openings 151 and 152.

The upper display unit 200 displays an image corresponding to the pixels of the lower display unit 100 except for an outer partial region and the periphery of the openings 151 and 152. In FIG. 1, the region where the voltage applying line 210, the pair of sensing lines 211 and 212, and the pair of crack sensing lines 215 and 216 are formed may not correspond to the display region where the image is displayed.

According to one embodiment, the upper display unit 200 may include a touch sensor that is additional formed thereon after the pixels (each pixel including the diode driving circuit and the organic light emitting diode) are formed on the flexible substrate of the lower display unit 100 and then sealed with a sealant. However, according to the exemplary embodiment, a separate flexible substrate on which the touch sensor is formed may be included.

When forming the openings 151 and 152, a process of removing the corresponding region of the lower display unit 100 and the upper display unit 200 is performed. In this process, a crack may be formed in the lower display unit 100 and/or the upper display unit 200. To detect an occurrence of the crack, the first crack sensing line 215 and the second crack sensing line 216 are formed around the first opening 151 and the second opening 152, respectively. In addition, referring to FIG. 2, in the present exemplary embodiment, the first crack sensing line 215 and the second crack sensing line 216 may be formed in the upper display unit 200.

The first crack sensing line 215 and the second crack sensing line 216 are connected to a voltage applying signal line 10 to receive the sensing voltage.

The first crack sensing line 215 transmits the sensing voltage provided from the voltage applying signal line 10 to a first detection signal line 11. The first detection signal line 11 is connected to the first data line 111-*d* to transmit the sensing voltage to the first data line 111-*d*.

The second crack sensing line 216 transmits the sensing voltage provided from the voltage applying signal line 10 to a second detection signal line 12. The second detection signal line 12 is connected to the second data line 112-*d* to transmit the sensing voltage to the second data line 112-*d*.

As shown in FIG. 1, the voltage applying signal line 10 according to the present exemplary embodiment includes the voltage applying line 210 and a peripheral voltage applying line 110. The voltage applying line 210 is formed in the upper display unit 200 as the first crack sensing line 215 and the second crack sensing line 216. The peripheral voltage applying line 110 is formed in the lower display unit 100 and is disposed in the peripheral area (including the bending portion 101 and the driver 102) of the lower display unit 100. The voltage applying line 210 and the peripheral voltage applying line 110 may be electrically connected through a voltage applying line pad 110-*c*.

Further, as shown in FIG. 1, the first detection signal line 11 includes a first peripheral sensing line 111 and the first sensing line 211. The first sensing line 211 is formed in the upper display unit 200 as the voltage applying line 210, the first crack sensing line 215, and the second crack sensing line 216. The first peripheral sensing line 111 is formed in the lower display unit 100 in the peripheral area (including the bending portion 101 and the driver 102) of the lower display unit 100. The first peripheral sensing line 111 and the first sensing line 211 may be electrically connected via a first sensing line pad 111-*c*.

Further, as shown in FIG. 1, the second detection signal line 12 includes a second peripheral sensing line 112 and the second sensing line 212. The second sensing line 212 is formed in the upper display unit 200 as the voltage applying line 210, the first crack sensing line 215, and the second crack sensing line 216. The second peripheral sensing line 112 is formed in the lower display unit 100 in the peripheral area (including the bending portion 101 and the driver 102) of the lower display unit 100. The second peripheral sensing line 112 and the second sensing line 212 may be electrically connected via a second sensing line pad 112-*c*.

The voltage applying line pad 110-*c*, the first sensing line pad 111-*c*, and the second sensing line pad 112-*c* may be formed in the lower display unit 100.

Hereinafter, the signals applied to the voltage applying signal line 10, the first detection signal line 11, and the second detection signal line 12 will be mainly described.

The voltage applying signal line 10 receives the sensing voltage from an external device (not shown) and transmits the sensing voltage to the first crack sensing line 215 and the second crack sensing line 216. In this case, as shown in FIG. 1, the voltage applying signal line 10 may have a symmetrical bilateral structure, and the same sensing voltage is applied on both sides. According to an exemplary embodiment, the voltage applying signal line 10 may be connected to one of the terminals of a driving chip 300 to receive the sensing voltage from the driving chip 300.

One end of the first crack sensing line 215 is connected to the voltage applying signal line 10, and the other end of the first crack sensing line 215 is connected to the first detection signal line 11. As a result, the sensing voltage transmitted from the voltage applying signal line 10 may be transmitted to the first detection signal line 11 via the first crack sensing line 215.

The first detection signal line 11 may have a symmetrical bilateral structure in which the wires extended to both sides meet in the peripheral area where the bending portion 101 and the driver 102 are disposed, and are electrically connected to the first data line 111-*d*. As a result, the sensing voltage is transmitted to the first data line 111-*d*.

If a crack is formed around the first opening 151 such that the first crack sensing line 215 is disconnected, the sensing voltage is not transmitted to the first detection signal line 11 and the first data line 111-*d*.

According to one embodiment, an occurrence of a crack that may be formed around the first opening 151 can be sensed by applying the sensing voltage to the first data line 111-*d* and sensing the luminance of the pixel column connected to the first data line 111-*d*. For example, when the sensing voltage is applied to the first data line 111-*d*, the pixel column connected to the first data line 111-*d* does not emit light, and when the sensing voltage is not applied to the first data line 111-*d*, the pixel column connected to the first data line 111-*d* emits light to display the luminance (referring to FIG. 8).

For this purpose, a driving voltage ELVDD that is a high voltage to drive the pixel including the organic light emitting diode is applied as the sensing voltage. When the driving voltage ELVDD that is applied to the data line is applied as the sensing voltage, there is no voltage difference between a source side and a gate side of a driving transistor of the pixel that outputs the current to the organic light emitting diode, so no driving current flows through the organic light emitting diode, and the pixel column connected to the corresponding data line does not emit light. However, if a disconnection has occurred in the first crack sensing line 215 due to a crack formed around the first opening 151, no sensing voltage is applied to the data line due to the disconnection, and the voltage difference that is generated between the source side and the gate side of the driving transistor causes the driving current to flow through the organic light emitting diode, and the organic light emitting diode emits light.

Further, one end of the second crack sensing line 216 is connected to the voltage applying signal line 10, and the other end of the second crack sensing line 216 is connected to the second detection signal line 12. As a result, the sensing voltage transmitted from the voltage applying signal line 10 may be transmitted to the second detection signal line 12 via the second crack sensing line 216.

The second detection signal line 12 may also have the symmetrical bilateral structure in which the wires extended to both sides meet in the peripheral area where the bending portion 101 and the driver 102 are disposed, and are electrically connected to the second data line 112-*d*. As a result, the sensing voltage is transmitted to the second data line 112-*d*.

If a crack is formed around the second opening 152 such that the second crack sensing line 216 is disconnected, the sensing voltage is not transmitted to the second detection signal line 12 and the second data line 112-*d*. As a result, the pixel column connected to the second data line 112-*d* emits light, thereby displaying the luminance (referring to FIG. 8). If the second crack sensing line 216 is not disconnected, when the sensing voltage is applied to the second data line 112-*d*, the pixel column connected to the second data line 112-*d* does not emit light.

The structure of the pixel connected to the second data line 112-*d* may be the same as the structure of the pixel connected to the first data line 111-*d*.

According to another exemplary embodiment, instead of allowing the pixel column to emit light, the driving chip 300 may read a voltage value input through the detection signal lines 11 and 12 to determine an occurrence of a crack.

According to the above structure, when the crack has occurred around the first opening 151, the first crack sensing line 215 is disconnected, and the pixel column connected to the first data line 111-*d* emits light in a line form. As a result, it may be determined that a crack is formed around the first opening 151.

When the crack has occurred around the second opening 152, the second crack sensing line 216 is disconnected, and the pixel column connected to the second data line 112-*d* emits light in a line form. As a result, it may be determined that a crack is formed around the second opening 152.

When it is determined whether a crack has been formed in the process of forming the opening of two openings 151 and 152, a more accurate result may be provided to a detector (not shown).

On the other hand, referring to FIG. 2, the display device according to the present exemplary embodiment includes the window 400, and the openings 151 and 152 are not formed in the window 400. Foreign particulates are prevented from flowing into the openings 151 and 152 of the display device from the front surface through the window 400. The window 400 is formed of a material having a flexible characteristic, and a polarizer (not shown) may be attached to one side of the window 400. The polarizer may be included to prevent light incident from the outside to the window 400 from being reflected by wires and electrodes of the touch sensor and then recognized to a user.

A variety of electronic devices such as an optical device and/or element such as a camera, a flash, or an infrared or ultraviolet ray sensor may be disposed in the rear surface or the inside of the openings 151 and 152.

Next, the structure of the exemplary embodiment of FIG. 1 and FIG. 2 is described with reference to FIG. 3 and FIG. 4 by distinguishing the portion of the openings 151 and 152 and the portion of the peripheral areas including the bending portion 101 and the driver 102.

Figure 3:
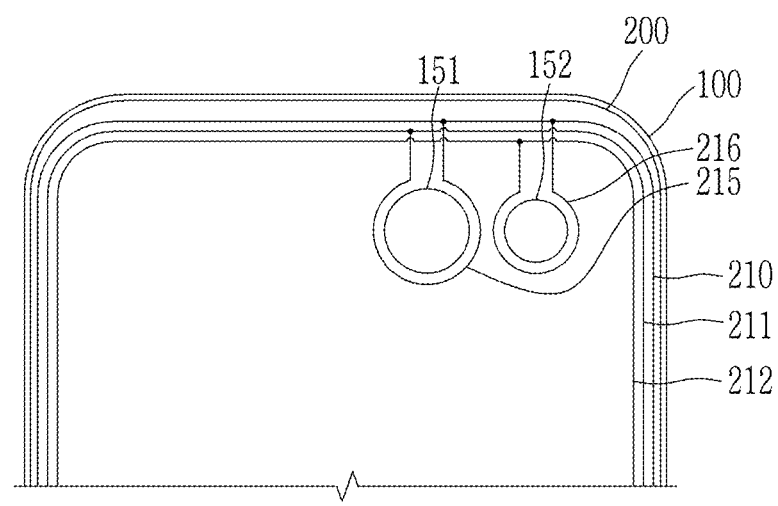
FIG. 3 is a view showing an opening portion in a display device according to an exemplary embodiment.

First, the wiring connection relationship of the portion of the openings 151 and 152 is described in FIG. 3.

FIG. 3 is a view showing an opening portion in a display device according to an exemplary embodiment.

The voltage applying line 210 according to the present exemplary embodiment is formed along an outer portion of the upper display unit 200, and may be disposed in a non-display region that does not overlap the display area. Referring to FIG. 1, the voltage applying line 210 is electrically connected to the peripheral voltage applying line 110 of the lower display unit 100 through the voltage applying line pad 110-*c* in the bending portion 101 of the lower display unit 100. As a result, the sensing voltage is transmitted to the voltage applying line 210 of the upper display unit 200.

The pair of sensing lines 211 and 212 are also formed along the outer portion of the upper display unit 200 and may be disposed in the non-display region that does not overlap the display area. Referring to FIG. 1, both ends of the first sensing line 211 are electrically connected to the first peripheral sensing line 111 of the lower display unit 100 through the first sensing line pad 111-*c*. In addition, both ends of the second sensing line 212 are electrically connected to the second peripheral sensing line 112 of the lower display unit 100 through the second sensing line pad 112-*c*.

The pair of crack sensing lines 215 and 216 are disposed along the periphery of the openings 151 and 152, respectively, and the crack sensing lines 215 and 216 are formed to be disconnected when a crack is formed while the openings 151 and 152 are physically formed in the upper display unit 200 and the lower display unit 100. For this purpose, the openings 151 and 152 and the pair of crack sensing lines 215 and 216 are formed adjacent to each other.

That is, the first crack sensing line 215 is formed along the periphery of the first opening 151, and both ends of the first crack sensing line 215 are respectively connected to the first sensing line 211 and the voltage applying line 210. As a result, the sensing voltage is transmitted from the voltage applying line 210 to the first sensing line 211, and if the first crack sensing line 215 is disconnected, the sensing voltage is not transmitted to the first sensing line 211, thereby determining an occurrence of the crack around the first opening 151.

Similarly, the second crack sensing line 216 is formed along the periphery of the second opening 152, and both ends of the second crack sensing line 216 are respectively connected to the second sensing line 212 and the voltage applying line 210. As a result, the sensing voltage is transmitted from the voltage applying line 210 to the second sensing line 212, and if the second crack sensing line 216 is disconnected, the sensing voltage is not transmitted to the second sensing line 212, thereby determining an occurrence of the crack around the second opening 152.

A crack may be formed in the outer portion of the display panel. According to the present disclosure, the pixel column emits light only when the crack sensing lines 215 and 216 are disconnected, and when the first and second sensing lines 211 and 212 are disconnected, the pixel column does not emit light as long as the crack sensing lines 215 and 216 are connected.

As discussed above, if a crack is formed around the openings 151 and 152 such that at least one of the crack sensing lines 215 and 216 is disconnected, the sensing voltage is not transmitted to the sensing lines 211 and 212. As a result, the sensing voltage is not applied to the sensing line pads 111-c and 112-c, and the sensing voltage is not applied to the data lines 111-d and 112-d. Therefore, the pixel column connected to the data lines 111-d and 112-d emits light to display the luminance (referring to FIG. 8).

However, when a crack is formed at either the right side or the left side of the sensing lines 211 and 212 such that the corresponding part is disconnected, the sensing voltage is transmitted to the sensing line pads 111-c and 112-c of the opposite side, unlike the case where the crack sensing lines 215 and 216 are disconnected. For example, when a crack occurs on the left side of the first sensing line 211, the sensing voltage passing through the first crack sensing line 215 is not transmitted to the first sensing line pad 111-c on the left side, but is transmitted to the first sensing line pad 111-c on the right side. As a result, the sensing voltage is transmitted to the first data line 111-d through the first sensing line pad 111-c on the right side, and the pixel column connected to the first data line 111-d does not emit light indicating that there is no crack around the first opening 151.

Accordingly, the present sensing structure can sense only a crack that has occurred around the openings 151 and 152.

Next, the wiring structure of the peripheral area is described with reference to FIG. 4.

Figure 4:
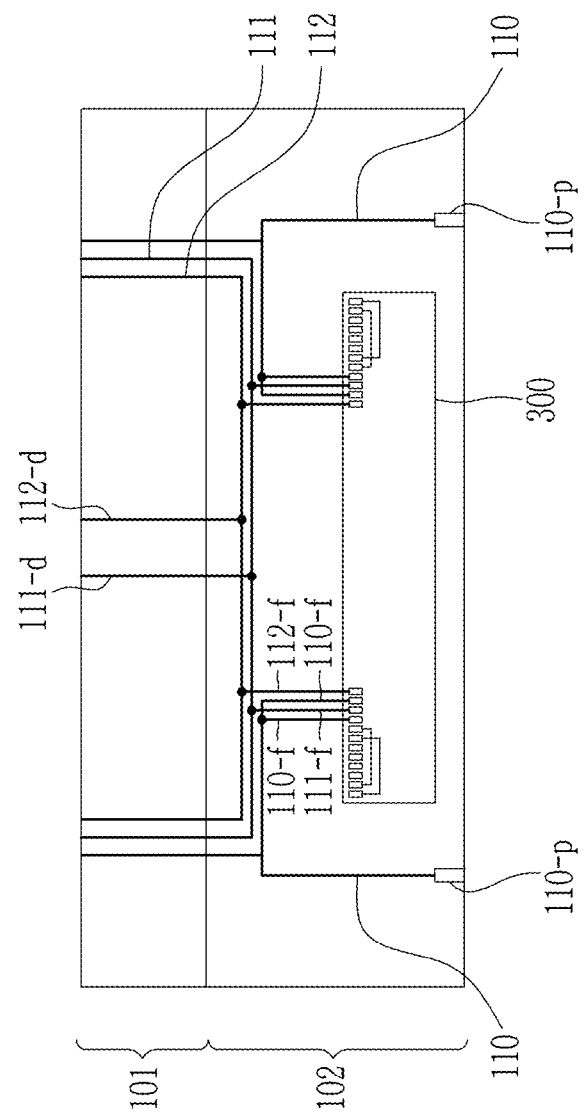
FIG. 4 is a view showing a peripheral area in a display device according to an exemplary embodiment in detail.

FIG. 4 is a view showing a peripheral area in a display device according to an exemplary embodiment in detail.

The peripheral area of the lower display unit 100 includes the driver 102 in which the driving chip 300 is disposed and the bending portion 101 that connects the driver 102 to the display area.

In the driver 102, the driving chip 300, an input pad receiving a signal from an external device (not shown) and the driving signal wires are formed. In FIG. 4, only some of the input pad and the driving signal wires are shown. In the driving chip 300, a data voltage is transmitted to each data line of the display device to display an image, and is the data lines are omitted in FIG. 4 for the convenience of illustration.

In the bending portion 101 and the driver 102 of the peripheral area of the lower display unit 100, the peripheral voltage applying line 110 and a pair of peripheral sensing lines 111 and 112 are formed.

The peripheral voltage applying line 110 is a wire transmitting the sensing voltage applied from the external device or the driving chip 300. The peripheral voltage applying line 110 includes a first portion extending in the horizontal direction to the driver 102 and a second portion extending therefrom in the vertical direction to be extended from the driver 102 to the bending portion 101. The peripheral voltage applying line 110 passes through the bending portion 101, and is connected to the voltage applying line 210 of the upper display unit 200 through the voltage applying line pad 110-c. In addition, the peripheral voltage applying line 110 includes a third portion extending toward a peripheral voltage applying line pad 110-p and receives the sensing voltage from the external device through the peripheral voltage applying line pad 110-p. The peripheral voltage applying line 110 may receive the sensing voltage from the driving chip 300 via a peripheral voltage applying line driving chip connection line 110-f that extends toward the driving chip 300. In FIG. 4, two peripheral voltage applying line driving chip connection lines 110-f are shown as an exemplary embodiment, however other numbers of peripheral voltage applying line driving chip connection lines 110-f may be provided without deviating from the scope of the present disclosure. The peripheral circuit applying line 110 of the present exemplary embodiment has a right/left symmetrical structure.

Each of the peripheral sensing lines 111 and 112 may be used to determine whether the sensing voltage transmitted from the voltage applying signal line 10 is transmitted through the crack sensing lines 215 and 216 or is not transmitted by the disconnection. Each of the peripheral sensing lines 111 and 112 of the present exemplary embodiment has the right/left symmetrical structure.

The first peripheral sensing line 111 includes a first portion extending in the horizontal direction to the driver 102 and a second portion extending therefrom in the vertical direction to be extended from the driver 102 to the bending portion 101. The first peripheral sensing line 111 passes through the bending portion 101 and is connected to the first sensing line 211 of the upper display unit 200 through the first sensing line pad 111-c. In addition, the first peripheral sensing line 111 is connected to the first data line 111-d that extends in the vertical direction. As a result, if the first crack sensing line 215 is disconnected due to a crack formed around the first opening 151, the sensing voltage is not applied to the first data line 111-d, and if there is no crack formed around the first opening 151, the sensing voltage is applied to first data line 111-d. The pixel column that is connected to the first data line 111-d operates depending on the level of the applied voltage and may be set so that the luminance is not displayed when the sensing voltage is applied, and the luminance is displayed (referring to FIG. 8) when no sensing voltage is applied. In this case, it is necessary to apply a voltage having a level that is capable of turning on a switching transistor to the gate line (not shown) in each pixel, thereby applying the data voltage to each pixel. Further, the first peripheral sensing line 111 includes a first peripheral sensing line driving chip connection line 111-f that extends toward the driving chip 300, thereby sensing the application of the sensing voltage in the driving chip 300 according to an exemplary embodiment.

The second peripheral sensing line 112 includes a first portion extending in the horizontal direction to the driver 102 and a second portion extending therefrom in the vertical direction to be extended from the driver 102 to the bending portion 101. The second peripheral sensing line 112 passes through the bending portion 101 and is connected to the second sensing line 212 of the upper display unit 200 through the second sensing line pad 112-c. In addition, the second peripheral sensing line 112 is connected to the second data line 112-d that extends in the vertical direction. As a result, if the second crack sensing line 216 is disconnected due to a crack formed around the second opening 152, the sensing voltage is not applied to the second data line 112-d, and if there is no crack formed around the second opening 152, the sensing voltage is applied to the second data line 112-d. The pixel column that is connected to the second data line 112-d operates depending on the level of the applied voltage and may be set such that the luminance is not displayed when the sensing voltage is applied, and the luminance is displayed (referring to FIG. 8) when no sensing voltage is applied. In this case, it is necessary to apply the voltage having a level that is capable of turning on a switching transistor to the gate line (not shown) in each pixel, thereby applying the data voltage to each pixel. Further, the second peripheral sensing line 112 includes a second peripheral sensing line driving chip connection line 112-f that extends toward the driving chip 300, thereby sensing the application of the sensing voltage from the driving chip 300 according to an exemplary embodiment.

In addition, referring to FIG. 1, in the lower display unit 100, the pads 110-c, 111-c, and 112-c that are connected to the peripheral voltage applying line 110 and the pair of peripheral sensing lines 111 and 112 are formed. Each of the pads 110-c, 111-c, and 112-c serves to electrically connect the voltage applying line 210 of the upper display unit 200 and the pair of the sensing lines 211 and 212, respectively.

According to one embodiment, the number of openings formed in the display device is not limited to two, and any number of openings may be formed without deviating from the scope of the present disclosure. As the number of openings increases, the number of detection signal lines may also increase to correspond to the number of the openings.

In the display device according to the exemplary embodiment of FIG. 1 to FIG. 4, the first crack sensing line 215 and the second crack sensing line 216 are formed in the lower display unit 100 and the upper display unit 200 to sense a crack that may be formed while forming the first opening 151 or the second opening 152. If the crack is formed around the first opening 151, the first crack sensing line 215 is disconnected such that the sensing voltage that is transmitted through the voltage applying signal line 10 is not transmitted to the first detection signal line 11, thereby no sensing voltage is applied to the first data line 111-d that is connected to the first detection signal line 11, and the pixel column that is connected to the first data line 111-d displays the specific luminance. In addition, if the crack is formed around the second opening 152, the second crack sensing line 216 is disconnected such that sensing voltage that is transmitted through the voltage applying signal line 10 is not transmitted to the second detection signal line 12, thereby no sensing voltage is applied to the second data line 112-d that is connected to the second detection signal line 12, and the pixel column that is connected to the second data line 112-d displays the specific luminance.

Here, the sensing voltage may be the driving voltage ELVDD (the high voltage) that is applied to drive the pixel (i.e., the diode driving circuit and the organic light emitting diode). If no sensing voltage is applied, a low voltage (e.g., ELVSS) is transmitted to the first data line 111-d and the second data line 112-d through the detection signal lines 11 and 12.

According to one embodiment, the first data line 111-d and the second data line 112-d may not be directly connected with the detection signal lines 11 and 12. When displaying an image, the first data line 111-d and the second data line 112-d are applied with a data voltage to display an image. That is, the first data line 111-d and the second data line 112-d may have the structure in which the data voltage that is provided from the driving chip 300 is applied, whereas the sensing voltage is applied when testing the display device to determine whether a crack has been formed. This structure is described through FIG. 5.

Figure 5:
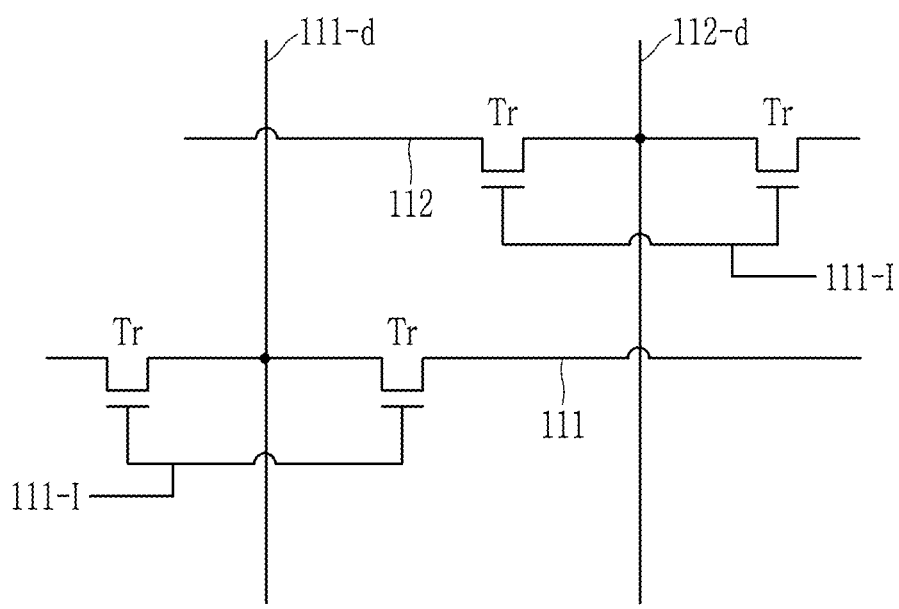
FIG. 5 is a circuit diagram showing a structure in which a data line and a sensing line are connected in a display device according to an exemplary embodiment in detail.

FIG. 5 is a circuit diagram showing a structure in which a data line and a sensing line are connected in a display device according to an exemplary embodiment in detail.

In FIG. 5, the first data line 111-d and the second data line 112-d formed in the vertical direction are shown, and the first peripheral sensing line 111 and the second peripheral sensing line 112 formed in the horizontal direction are also shown. The first data line 111-d and the first peripheral sensing line 111 are connected through one or more transistors Tr therebetween without the direct connection. In addition, the second data line 112-d and the second peripheral sensing line 112 are connected through one or more transistors Tr therebetween without the direct connection.

If the transistors Tr are turned on through an input signal 111-I, the peripheral sensing lines 111 and 112 are connected to data lines 111-d and 112-d. Since the image is not displayed when testing the display device for a crack, no data voltage is applied from the driving chip 300 to the data lines 111-d and 112-d. That is, if the input signal 111-I is applied, the first data line 111-d and the first peripheral sensing line 111 are electrically connected, and the second data line 112-d and the second peripheral sensing line 112 are also electrically connected. When the sensing voltage is not applied to each of the data lines 111-d and 112-d, the connected pixel column displays the luminance.

In the above, the structure for detecting a crack that occurs in the vicinity of the openings 151 and 156 is provided. According to an exemplary embodiment, a structure for detecting a crack occurring in the display panel itself or a crack occurring in the bending portion 101 may be further included.

Figure 6:
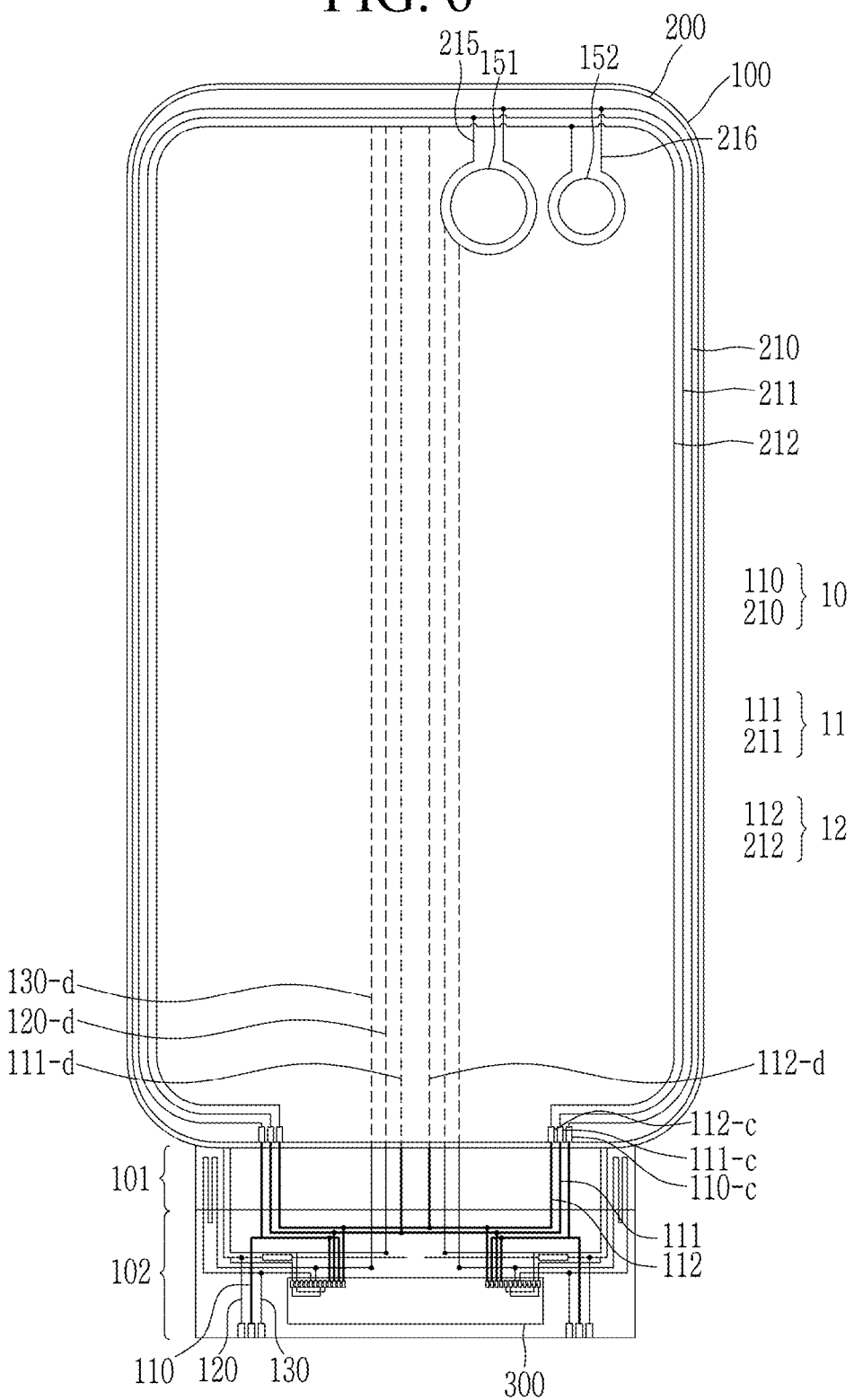
FIG. 6 is a top plan view of a display device according to another exemplary embodiment.
Figure 7:
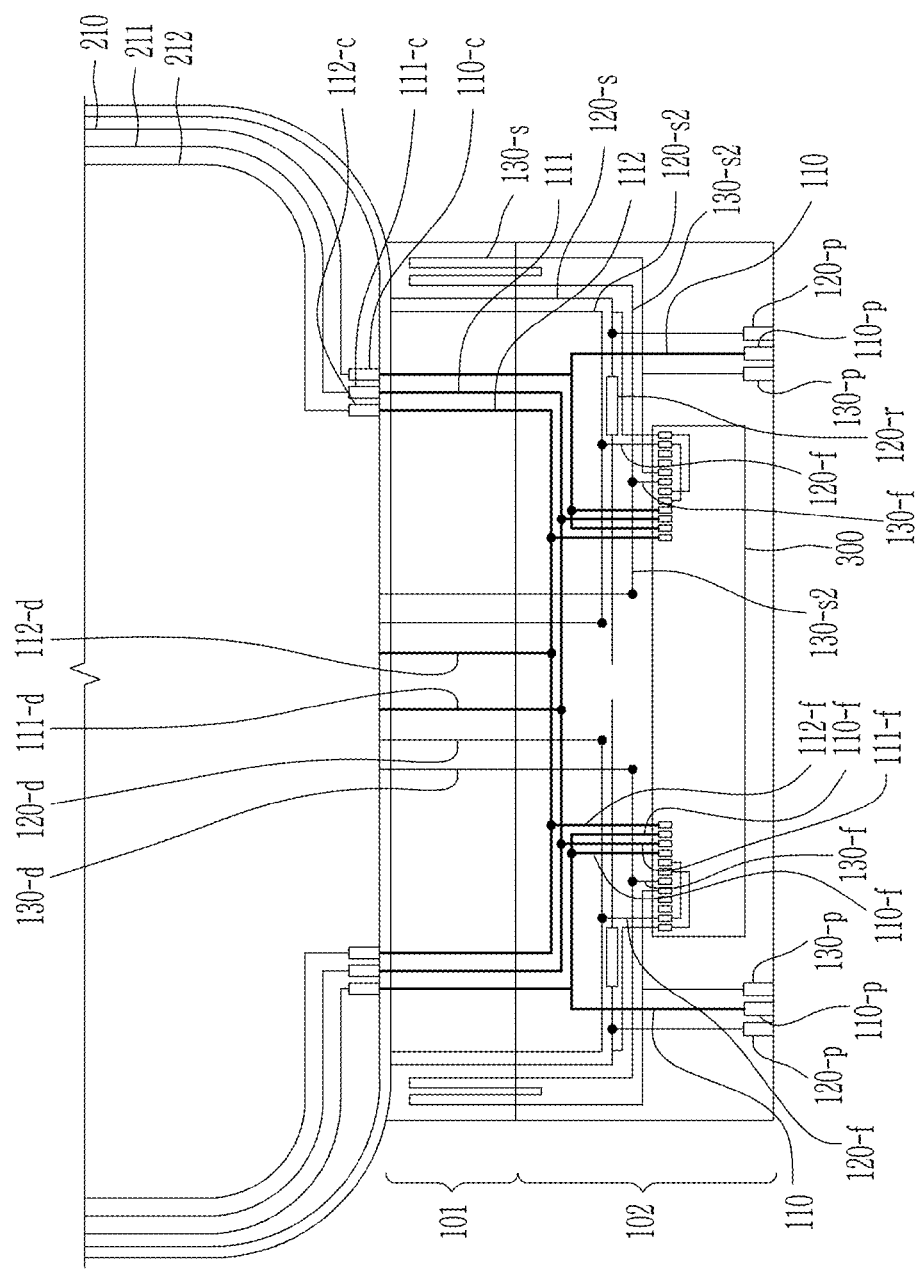
FIG. 7 is a view showing surroundings of a driver in detail in a display device according to another exemplary embodiment.

An example of a display device for detecting two additional cracks is shown in FIG. 6 and FIG. 7.

FIG. 6 is a top plan view of a display device according to another exemplary embodiment, and FIG. 7 is a view showing surroundings of a driver in a display device according to another exemplary embodiment.

In FIG. 6 and FIG. 7, bold lines (line with a thicker thickness) and thin lines are shown in the peripheral area that includes the bending portion 101 and the driver 102. The bold lines indicate that the wiring for detecting a crack has the same structure as the exemplary embodiment of FIG. 1. The wiring that is not included in FIG. 1 are shown as thin lines in FIG. 6 and FIG. 7 to clearly distinguish them from the wiring shown in FIG. 1.

Hereinafter, features of the display device shown in the exemplary embodiment of FIG. 6 and FIG. 7 that are not mentioned in FIG. 1 are described.

The exemplary embodiment of FIG. 6 and FIG. 7 includes a wiring 120 for sensing presence/absence of a crack of the lower display unit 100 and the upper display unit 200 and a wiring 130 for sensing presence/absence of a crack of the bending portion 101 as well as the wiring that senses the crack around the openings 151 and 152. The wiring 120 (herein referred to as a display panel crack sensing wiring) sensing a crack of the lower display unit 100 and the upper display unit 200 and the wiring 130 (herein referred to as a bending portion crack sensing wiring) sensing a crack of the bending portion 101 may have a structure including a long wire with an input terminal and an output terminal. The sensing voltage is transmitted to the input terminal, and data lines 120-d and 130-d are respectively connected to the output terminal.

The wiring 120 for sensing a crack of the lower display unit 100 and the upper display unit 200 is formed in the lower display unit 100 and in the driver 102, and has a structure for receiving the sensing voltage to flow along the outer portion of the display area of the lower display unit 100 of the display panel and then transmitted back to the driver 102. If a crack is not formed in the lower display unit 100 such that the wiring 120 is not disconnected, the sensing voltage is returned to the driver 102. The input terminal of the wiring 120 for sensing the crack of the lower display unit 100 and the upper display unit 200 receives the sensing voltage, and the output terminal is connected to the third data line 120-d. If the wiring 120 for sensing a crack of the lower display unit 100 and the upper display unit 200 is not disconnected, the sensing voltage is transmitted to the third data line 120-d such that the pixel column connected to the third data line 120-d does not display the predetermined luminance, however if the wiring 120 is disconnected, the sensing voltage is not transmitted to the third data line 120-d such that the pixel column connected to the third data line 120-d displays the predetermined luminance.

On the other hand, the wiring 130 for sensing a crack of the bending portion 101 is formed in the driver 102 of the lower display unit 100 and the bending portion 101, and has a structure for receiving the sensing voltage to flow along an inside of the bending portion 101 and to be transmitted back to the driver 102. If there is no crack in the bending portion 101 such that the wiring 130 is not disconnected, the sensing voltage is returned to the driver 102. The input terminal of the wiring 130 for sensing a crack of the bending portion 101 receives the sensing voltage, and the output terminal is connected to the fourth data line 130-d. If the wiring 130 for sensing a crack of the bending portion 101 is not disconnected, the sensing voltage is transmitted to the fourth data line 130-d such that the pixel column connected to the fourth data line 130-d does not display the predetermined luminance, however if the wiring 130 is disconnected, the sensing voltage is not transmitted to the fourth data line 130-d such that the pixel column connected to the fourth data line 130-d displays the predetermined luminance.

The input terminals of the wiring 120 for sensing a crack of the lower display unit 100 and the upper display unit 200 and the wiring 130 for sensing a crack of the bending portion 101 may be connected to the outside to receive the sensing voltage from an external device (not shown). According to an exemplary embodiment, they may receive the sensing voltage from the driving chip 300.

According to an exemplary embodiment, the output terminals of the wiring 120 for sensing a crack of the lower display unit 100 and the upper display unit 200 and the wiring 130 for sensing a crack of the bending portion 101 may be connected to the driving chip 300, not to the data lines 120-d and 130-d, to check whether the sensing voltage is transmitted from the driving chip 300.

More detailed features of the wiring 120 for sensing a crack of the lower display unit 100 and the upper display unit 200 and the wiring 130 for sensing a crack of the bending portion 101 are described with reference to FIG. 7.

The wiring 120 for sensing a crack of the lower display unit 100 and the upper display unit 200 includes two wiring portions 120-s and 120-s2 that extend in the horizontal direction in the driver 102, the first wiring portion 120-s is connected to the input terminal, and the second wiring portion 120-s2 is connected to the output terminal. The first wiring portion 120-s extends in the vertical direction, and further includes a portion that extends toward a display panel crack sensing pad 120-p and receives the sensing voltage from the external device through the display panel crack sensing pad 120-p. In addition, the first wiring portion 120-s may further include a display panel crack sensing driving chip connection line 120-f that extends toward the driving chip 300, thereby receiving the sensing voltage from the driving chip 300.

The first wiring portion 120-s includes a sensing portion that extends in the vertical direction therefrom, passes through the bending portion 101 from the driver 102, and extends to the lower display unit 100. In addition, the first wiring portion 120-s may further include a compensation resistor 120-r that makes resistance difference between the first wiring portion 120-s and the second wiring portion 120-s2 to be substantially zero. Although not shown in FIG. 6 and FIG. 7, the sensing portion has a wiring structure that is formed along the outer portion of the display area of the lower display unit 100 and is returned along the same outer portion to be connected to the second wiring portion 120-s2.

The second wiring portion 120-s2 is connected to the third data line 120-d, and may be connected to the driving chip 300 according to an exemplary embodiment. The connection between the second wiring portion 120-s2 and the third data line 120-d may correspond to the structure shown in FIG. 5.

Referring to FIG. 6 and FIG. 7, the wiring 120 for sensing a crack of the lower display unit 100 and the upper display unit 200 may be formed on each of the right and left sides as one pair although such an embodiment is not limiting.

On the other hand, the wiring 130 for sensing a crack of the bending portion 101 includes two wiring portions 130-s and 130-s2 that extend in the horizontal direction in the driver 102, the first wiring portion 130-s is connected to the input terminal, and the second wiring portion 130-s2 is connected to the output terminal. The first wiring portion 130-s extends in the vertical direction and further includes a portion that extends toward a bending portion crack sensing pad 130-p and receives the sensing voltage from the external device through the bending portion crack sensing pad 130-p. In addition, the first wiring portion 130-s may further include a bending portion crack sensing driving chip connection line 130-f that extends toward the driving chip 300 to receive the sensing voltage from the driving chip 300.

The first wiring portion 130-s includes a sensing portion that extends in the vertical direction therefrom from the driver 102 to the bending portion 101. The sensing portion may have a structure that reciprocates in the bending portion 101 and the driver 102 several times as shown in FIG. 6 and FIG. 7, and has a wiring structure that is connected to the second wiring portion 130-s2.

The second wiring portion 130-s2 is connected to the fourth data line 130-d, and may be connected to the driving chip 300 according to an exemplary embodiment. The connection of the second wiring portion 130-s2 and the fourth data line 130-d may correspond to the structure shown in FIG. 5.

Referring to FIG. 6 and FIG. 7, the wiring 130 for sensing a crack of the bending portion 101 may be formed on each of the right and left sides as one pair although such an embodiment is not limiting.

In the exemplary embodiment of FIG. 6, in addition to a crack that may be formed around the openings 151 and 152, a crack that may be formed in the display panel (the lower display unit 100 in the exemplary embodiment of FIG. 6) or a crack that may be formed in the bending portion 101 can also be sensed. If a crack is formed in the lower display unit 100 and the upper display unit 200 or the bending portion 101, the wiring 120 or the wiring 130 for sensing the crack are disconnected such that the sensing voltage is not transmitted to the data lines 120-*d* and 130-*d*.

Figure 8:
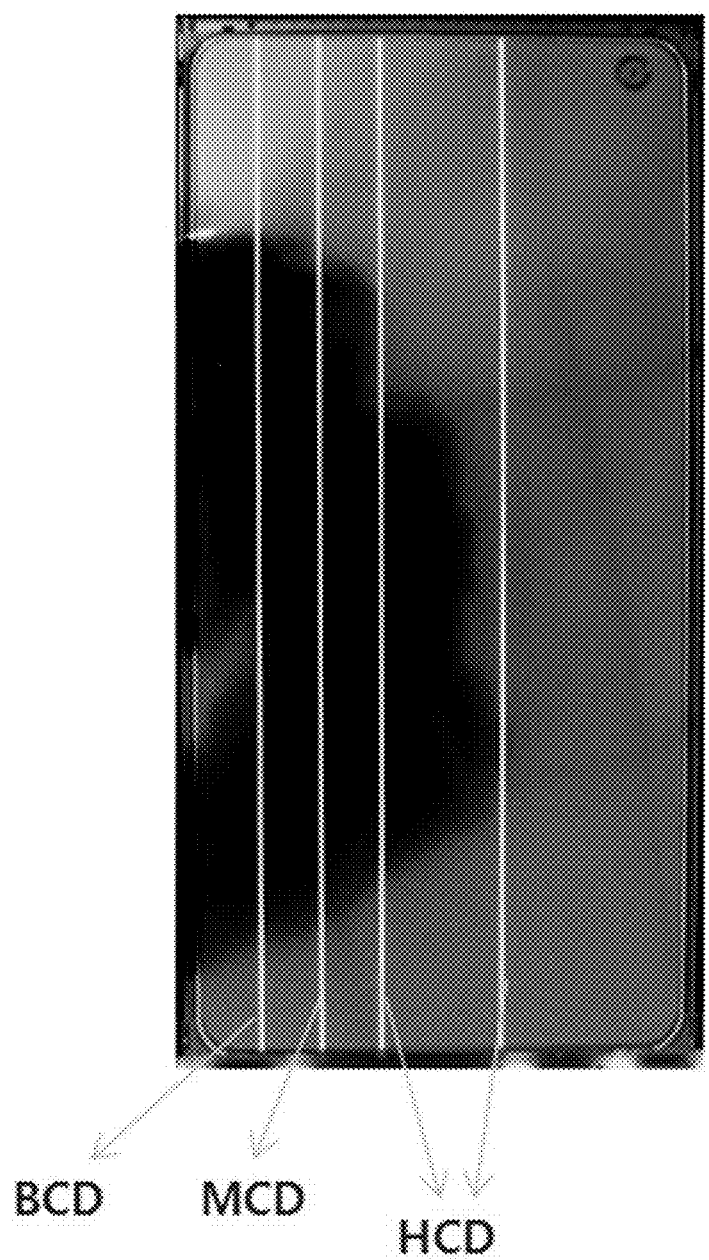
FIG. 8 is a view showing a display device according to another exemplary embodiment when a disconnection occurs in the display device.

When the sensing voltage is not applied to the data lines 120-*d* and 130-*d*, the pixel column connected thereto displays the luminance as shown in FIG. 8.

FIG. 8 is a view showing a display device according to another exemplary embodiment when a disconnection occurs in the display device.

In FIG. 8, HCD is an abbreviation of hole crack detection, and it is shown that the pixel column displays the luminance when the sensing voltage is not applied to the corresponding data line that is connected to the first detection signal line 11 and the second detection signal line 12, respectively.

In the present disclosure, the elements 151 and 152 are described as openings, however, they may refer to other features of the display device including, but not limited to, holes, through-holes, through holes, and so on. In some embodiments, there may be at least one element (such as a layer and a substrate) of the display panel included or disposed in the openings 151 and 152. While the openings 151 and 152 are formed, the openings 151 and 152 may be entirely opened without any elements therein, or some elements may remain in the openings 151 and 152 because the process of forming the openings 151 and 152 may be fulfilled with some elements left therein.

MCD is an abbreviation of module crack detection, and it is shown that the pixel column displays the luminance when the sensing voltage is not applied to the corresponding data line that is connected to the wiring 120 for detecting a crack in the lower display unit 100 and the upper display unit 200.

BCD is an abbreviation of bending crack detection, and it is shown that the pixel column displays the luminance when the sensing voltage is not applied to the corresponding data line that is connected to the wiring 130 for detecting a crack in the bending portion 101.

According to one embodiment, the sensing voltage may be the high voltage driving voltage (ELVDD) for driving the pixel (e.g., the diode driving circuit and the organic light emitting diode). If the sensing voltage is not applied due to a crack, a relatively low voltage (e.g., ELVSS) is applied to the data lines 111-*d*, 112-*d*, 120-*d*, and 130-*d*. In this case, the voltage of the level at which the switching transistor may be turned on is applied to the gate line (not shown) in each pixel, and the low voltage applied to the data lines 111-*d*, 112-*d*, 120-*d*, and 130-*d* is provided to each pixel. The driving voltage ELVDD of the high voltage and the low voltage that is input from the data lines 111-*d*, 112-*d*, 120-*d*, and 130-*d* are respectively applied to the source side and the gate side of the driving transistor of the pixel so that the driving transistor provides the output current to the organic light emitting diode of the pixel. As a result, the organic light emitting diode of each of the pixels in the pixel column emits light, and as shown in FIG. 8, the luminance is displayed along the pixel column.

In contrast, when the sensing voltage is applied to the data lines 111-*d*, 112-*d*, 120-*d*, and 130-*d* because there is no crack, and the driving voltage ELVDD of the high voltage is respectively applied to the source side and the gate side of the driving transistor of the pixel such that the driving transistor does not provide the output current, thereby the output current does not flow through the organic light emitting diode, and the luminance is not displayed.

While the present disclosure has been described in connection with what is presently considered to be practical exemplary embodiments, it is to be understood that the present disclosure is not limited to the disclosed embodiments. On the contrary, the present disclosure is intended to cover various modifications and equivalent arrangements included within the spirit and scope of the appended claims.

DESCRIPTION OF SYMBOLS

100: lower display unit
200: upper display unit
300: driving chip
400: window
101: bending portion
102: driver
151, 152: opening
215, 216: crack sensing line
10: voltage applying signal line
110: peripheral voltage applying line
210: voltage applying line
110-*c*: voltage applying line pad
110-*f*: peripheral voltage applying line driving chip connection line
110-*p*: peripheral voltage applying line pad
11, 12: detection signal line
111, 112: peripheral sensing line
211, 212: sensing line
111-*c*, 112-*c*: sensing line pad
111-*f*, 112-*f*: peripheral sensing line driving chip connection line
111-I: input signal
111-*d*, 112-*d*, 120-*d*, 130-*d*: data line
120: display panel crack sensing wiring
120-*f*: display panel crack sensing driving chip connection line
120-*p*: display panel crack sensing pad
130: bending portion crack sensing wiring
130-*f*: bending portion crack sensing driving chip connection line
130-*p*: bending portion crack sensing pad
120-*r*: compensation resistor

What is claimed is:

1. A display device comprising:
a display panel including a first opening and a second opening;
a first crack sensing line disposed around the first opening; and
a second crack sensing line disposed around the second opening,
wherein the first opening and the second opening are surrounded by a display area displaying an image,
wherein a crack around the first opening is sensed by disconnection of the first crack sensing line, and
wherein a crack around the second opening is sensed by disconnection of the second crack sensing line.

2. The display device of claim 1, wherein
a first end of each of the first crack sensing line and the second crack sensing line receives a sensing voltage through a voltage applying signal line.

3. The display device of claim 2, wherein:
a second end of the first crack sensing line is connected to a first detection signal line; and
the first detection signal line is connected to a first data line.

4. The display device of claim 3, wherein:
a second end of the second crack sensing line is connected to a second detection signal line; and
the second detection signal line is connected to a second data line.

5. The display device of claim 4, wherein
the display panel includes:
a lower display unit including a bending portion and a driver; and
an upper display unit disposed on the lower display unit.

6. The display device of claim 5, wherein:
the lower display unit includes the display area including a pixel and a peripheral area disposed around the display area;
the bending portion and the driver are disposed in the peripheral area; and
the bending portion and the driver are protruded from a side of the display area.

7. The display device of claim 6, wherein
the pixel includes an organic light emitting diode and a diode driving circuit supplying a current to the organic light emitting diode.

8. The display device of claim 6, wherein
the voltage applying signal line includes a voltage applying line disposed in the upper display unit and a peripheral voltage applying line disposed in the lower display unit.

9. The display device of claim 8, wherein
the peripheral voltage applying line is formed across the bending portion of the lower display unit and the driver.

10. The display device of claim 8, wherein
the voltage applying line and the peripheral voltage applying line are electrically connected through a voltage applying line pad.

11. The display device of claim 8, wherein
the first detection signal line includes a first sensing line disposed in the upper display unit and a first peripheral sensing line disposed in the lower display unit.

12. The display device of claim 11, wherein
the first peripheral sensing line is formed across the bending portion of the lower display unit and the driver.

13. The display device of claim 12, wherein
the first sensing line and the first peripheral sensing line are electrically connected through a first sensing line pad.

14. The display device of claim 11, wherein
the second detection signal line includes a second sensing line disposed in the upper display unit and a second peripheral sensing line disposed in the lower display unit.

15. The display device of claim 14, wherein
the second peripheral sensing line is formed across the bending portion of the lower display unit and the driver.

16. The display device of claim 14, wherein
the second sensing line and the second peripheral sensing line are electrically connected through a second sensing line pad.

17. The display device of claim 5, wherein
the upper display unit includes a touch sensor for sensing a touch input.

18. The display device of claim 5, further comprising
a bending portion crack sensing wiring sensing a crack in the bending portion.

19. The display device of claim 1, further comprising
a display panel crack sensing wiring for sensing a crack formed in the display panel.

* * * * *